Jan. 23, 1962 R. T. CORNELIUS 3,018,145
BEARING
Filed May 4, 1959

INVENTOR
RICHARD T. CORNELIUS
Caswell & Lagaard
ATTORNEYS

United States Patent Office 3,018,145
Patented Jan. 23, 1962

3,018,145
BEARING
Richard T. Cornelius, Minneapolis, Minn., assignor, by mesne assignments, to Stewart-Warner Corporation, Chicago, Ill., a corporation of Virginia
Filed May 4, 1959, Ser. No. 810,720
3 Claims. (Cl. 308—174)

The herein disclosed invention relates to bearings and particularly to combination end thrust and radial thrust antifriction bearings, and has for an object to provide a bearing which will equalize the strains set up when the axis of the driving member makes an angle with the axis of the driven member.

Another object of the invention resides in constructing the bearing with an outer race and an inner race received within the same, said races having facing surfaces of revolution and antifriction rolling members therebetween transmitting radial thrust, and in further providing a third race having a surface of revolution facing a similar surface on one of said two first named races, with antifriction rolling members therebetween transmitting end thrust, and in further providing equalizing means functioning between said third race and the other of said first two races and guiding said third race for transverse movement relative to the bearing axis and tending to equalize the strain on said rolling members.

A still further object of the invention resides in constructing said equalizing means as a universal joint.

An object of the invention resides in constructing the equalizing means as a ball and socket joint with its center in the axis of the bearing.

Another object of the invention resides in utilizing as the third race a floating ring encircling the inner race.

An object of the invention resides in providing two spaced pairs of facing inner and outer surfaces of revolution with antifriction rolling members therebetween and transmitting radial thrust and in disposing said third race therebetween.

Other objects of the invention reside in the novel combination and arrangement of parts and in the details of construction hereinafter illustrated and/or described.

Figures 1, 2:
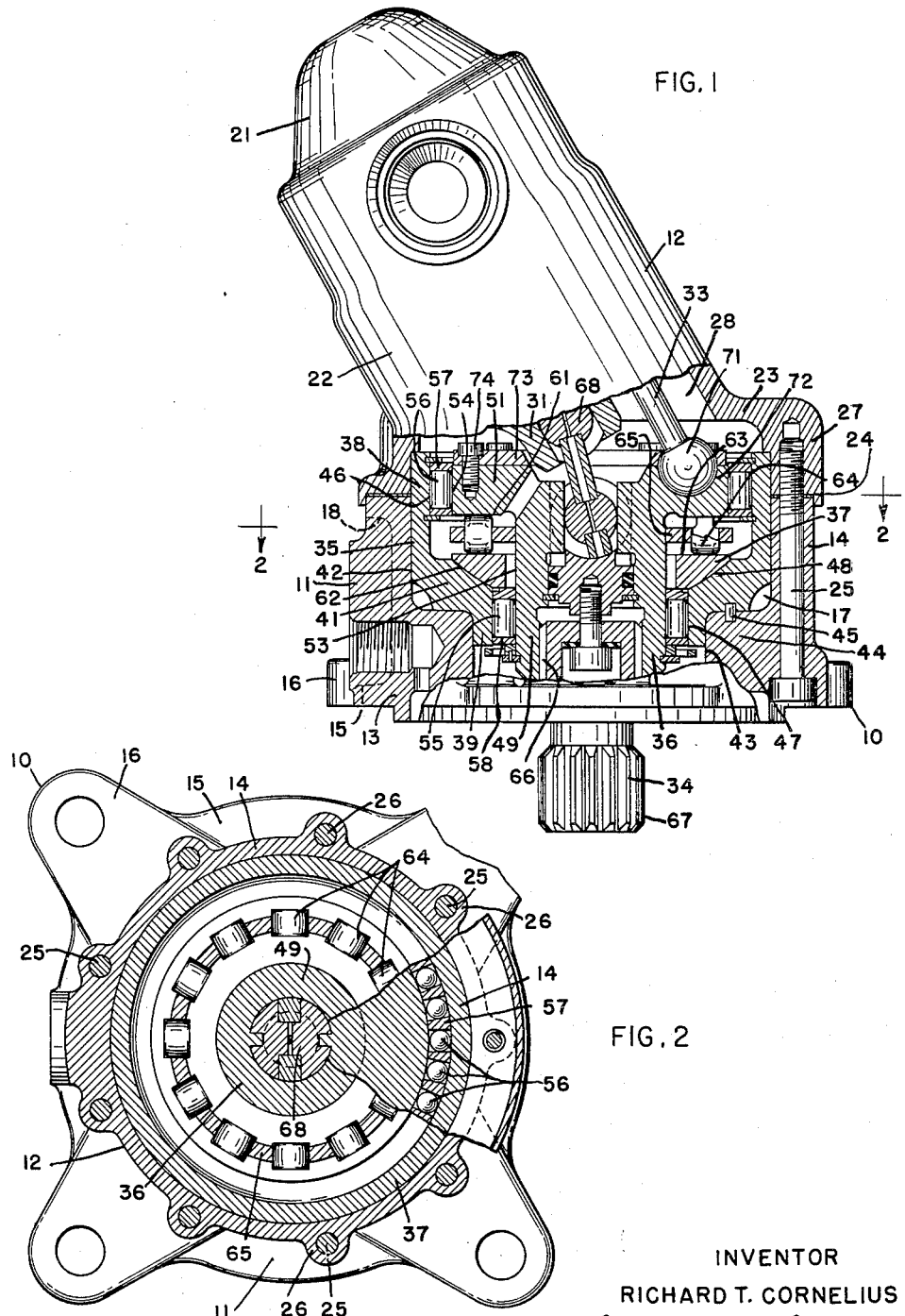
FIG. 1 is an elevational view of a wabble pump partly in section and illustrating an embodiment of the invention applied thereto.
FIG. 2 is a cross sectional view taken on line 2—2 of FIG. 1.

In the drawings a wabble pump 10 has been shown similar to the construction shown in the patent to Richard T. Cornelius, No. 2,787,143, issued April 2, 1957. This pump comprises a base 11 and on which a case 12 is mounted. The base 11 is generally circular in form being provided with a bottom wall 13 and an annular wall 14 extending upwardly therefrom. Encircling the base 11 is a flange 15 which has ears 16 projecting outwardly therefrom and by means of which the pump may be bolted to the structure with which it is to be used. By means of this construction, a chamber 17 is formed within the base 11. The upper part of the wall 14 is formed with a rim 18 and to which the case 12 is bolted.

The case 12 is cylindrical in form being formed with an end wall 21 and a cylindrical wall 22. The wall 22 has a flange 23 extending outwardly therefrom and which is arranged at an angle with reference to the wall 22 as shown in FIG. 1. Depending from the flange 23 is an annular skirt 27 which has a rabbet 24 extending about the same and in which is received the rim 18 of the wall 14 of base 11. Bolts 25 extend through the flange 15, through bosses 26 on the annular wall 14, through the rim 18, and are screwed into the skirt 27 to hold the case 12 secured to base 11. The case 12 is formed with a chamber 28 within the same.

Disposed within the chamber 28 is the pump proper which, forming no particular feature of the instant invention, has not been shown in detail. This pump includes a rotatable cylinder block 31 in which cylinders are formed and in which pistons travel. The pistons have connected to them connecting rods 33 and which are driven by a revoluble member 34 disposed within the base 11.

The bearing constituting the instant invention, consists of an outer race 35, an inner race 36, and an intermediate floating race 37. The race 35 has an outer annular portion 38, an inner annular portion 39 of smaller diameter than the portion 38, and an intermediate portion 41 disposed therebetween. The outer annular portion 38 fits within a bore 42 in the annular wall 14 of base 11 while the annular portion 39 fits in a bore 43 formed in a pad 44 extending inwardly from the wall 14. This race is provided with a key 45 keyed to the intermediate portion 41 and to the pad 44 and prevents rotation of the race. The outer annular portion 38 has an inner surface of revolution 46 which is in the form of a cylinder while the annular portion 39 has a similar surface of revolution 47. The intermediate portion 41 is formed with an arcuate surface 48 which is concentric with the surfaces 46 and 47 and which has its center in the axis of the bearing.

The inner race 36 has a core 49 disposed within the surface 47 and a flange 51 extending outwardly therefrom at its upper end and lying within the surface 46. The core 49 has an outer surface of revolution 53 while the flange 51 has an outer surface of revolution 54. One set of rollers 55 is disposed between the surfaces 53 and the surface 47. Another set of rollers 56 is disposed between the surfaces 54 and 46. Cages 57 and 58 hold these rollers in proper relation with respect to said races.

The underside of the flange 51 has an end surface of revolution 61 which faces downwardly and which is in the form of a plane disposed at right angles to the axis of the bearing. The floating race 37 has a spherical surface 62 which is of the same radius as the radius of the surface 48 of the intermediate portion 41 of the race 35 and fits within the same and is guided for transverse movement with respect to the axis of the bearing by means of the surface 48. The floating race 37 further has an end surface of revolution 63 which faces the surface 61 formed on the underside of the flange 51 of race 36. The surface 63 in this form of the invention is planiform and is substantially at right angles to the axis of the bearing. A set of rollers 64 is disposed between the surface 63 and the surface 61. A cage 65 holds these rollers in proper position.

The revoluble member 34 is connected to the race 36 by means of a spline 66. This revoluble member in turn is provided with a spline 67 and to which the same may be connected to the driving shaft of the motor operating the pump. A universal joint 68 such as disclosed in Patent No. 2,787,143, issued to R. T. Cornelius, April 2, 1957, is used to connect the cylinder block 31 to the race 36. The piston rods 33 have balls 71 attached to the ends of the same and which are seated in sockets 72 formed in the flange 51 of the inner race 36. These balls are held in said sockets by means of a retainer ring 73 encircling said balls and attached to the flange 51 by means of screws 74.

The method of operation of the invention is as follows: Due to the angularity of the thrust produced by the connecting rods 33 the entire inner race 36 tends to cock in a manner to bring the radial thrust on the rollers 56 on one side of the bearing and on the rollers 55 on the other side of the bearing. This causes all of the thrust to be placed on the rollers 64 on one side of the bearing. When such cocking movement occurs, the floating race 37 slides along the surface 48. This relieves the strain on the rollers 64 and equalizes the pressure on the same.

The advantages of the invention are manifest. The bearing is self-aligning and the stresses are automatically equalized. The bearing is easily fabricated and can be constructed at a nominal expense. The inner race serves as a race for both the radial and thrust rollers. The unit is extremely small in size and can be easily lubricated.

Changes in the specific form of the invention, as herein described, may be made within the scope of what is claimed without departing from the spirit of the invention.

Having described the invention, what is claimed as new and desired to be protected by Letters Patent is:

1. A bearing comprising an outer race and an inner race received within said outer race, one of said races being fixed and the other rotatable, said outer race having two inner cylindrical coaxial surfaces spaced axially from one another and facing inwardly, one being of greater diameter than the other, and an arcuate surface therebetween with its center in the axis of the bearing and extending outwardly from said inner surface of lesser diameter and toward the inner surface of greater diameter, said inner race having two cylindrical coaxial outer surfaces facing said inner surfaces and spaced therefrom, antifriction rolling members disposed between said inner and outer surfaces and slidable relative thereto in an axial direction and transmitting radial thrust, said inner race having a flat end surface normal to the axis of the bearing disposed at the end of the outer race of greater diameter and facing said arcuate surface and spaced therefrom, a floating race received between said inner and outer races and having an arcuate surface engaging the arcuate surface of the outer race and being supported thereby for rocking transverse movement, said floating race having a flat end surface facing and spaced from the end surface of said inner race, substantially parallel to the end surface on said inner race and antifriction rolling members disposed between said end surfaces and slidable relative thereto in a radial direction and transmitting end thrust.

2. A bearing comprising an outer race and an inner race received within said outer race, one of said races being fixed and the other rotatable, said outer race having two inner cylindrical coaxial surfaces spaced axially from one another and facing inwardly, one being of greater diameter than the other, and an arcuate surface therebetween with its center in the axis of the bearing and extending outwardly from said inner surface of lesser diameter and toward the inner surface of greater diameter, said inner race having two cylindrical coaxial outer surfaces facing said inner surfaces and spaced therefrom, substantially cylindrical rollers having the same diameter at both ends disposed between said inner and outer surfaces and slidable relative thereto in an axial direction and transmitting radial thrust, said inner race having a flat end surface normal to the axis of the bearing disposed at the end of the outer race of greater diameter and facing said arcuate surface and spaced therefrom, a floating race received between said inner and outer races and having an arcuate surface engaging the arcuate surface of the outer race and being supported thereby for rocking transverse movement, said floating race having a flat end surface facing and spaced from the end surface of said inner race, substantially parallel to the end surface on said inner race and substantially cylindrical rollers having the same diameter at both ends disposed between said end surfaces and slidable relative thereto in a radial direction and transmitting end thrust.

3. A bearing comprising an outer race and an inner race received within said outer race, one of said races being fixed and the other rotatable, said outer race having two inner cylindrical coaxial surfaces spaced axially from one another and facing inwardly, one being of greater diameter than the other, and an arcuate surface therebetween with its center in the axis of the bearing and extending outwardly from said inner surface of lesser diameter and toward the inner surface of greater diameter, said inner race having two cylindrical coaxial outer surfaces facing said inner surfaces and spaced therefrom, substantially cylindrical rollers having the same diameter at both ends disposed between said inner and outer surfaces and slidable relative thereto in an axial direction and transmitting radial thrust, said inner race having a flat end surface normal to the axis of the bearing disposed at the end of the outer race of greater diameter and facing said arcuate surface and spaced therefrom, a floating race received between said inner and outer races and having an arcuate surface engaging the arcuate surface of the outer race and being supported thereby for rocking transverse movement, said floating race having a flat end surface facing and spaced from the end surface of said inner race and substantially parallel to the end surface on said inner race and crowned substantially cylindrical rollers having the same diameter at both ends disposed between said end surfaces and slidable relative thereto in a radial direction and transmitting end thrust.

References Cited in the file of this patent

UNITED STATES PATENTS

| 1,194,679 | Storm | Aug. 15, 1916 |
| 1,647,853 | Budd et al. | Nov. 1, 1927 |
| 1,932,528 | Matthews | Oct. 31, 1933 |
| 2,088,418 | King | July 27, 1937 |
| 2,673,128 | Reed | Mar. 23, 1954 |

FOREIGN PATENTS

| 9,497 | Great Britain | Apr. 27, 1903 |
| 1,158,538 | France | Jan. 27, 1958 |